US006460045B1

(12) United States Patent
Aboulnaga et al.

(10) Patent No.: US 6,460,045 B1
(45) Date of Patent: Oct. 1, 2002

(54) SELF-TUNING HISTOGRAM AND DATABASE MODELING

(75) Inventors: Ashraf Aboulnaga, Madison, WI (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/268,589

(22) Filed: Mar. 15, 1999

(51) Int. Cl.$^7$ ............................................... G06F 17/00
(52) U.S. Cl. ............................. 707/102; 707/1; 707/2; 707/3; 707/4; 707/104
(58) Field of Search ............................ 707/1–10, 101, 707/102, 103

(56) References Cited

U.S. PATENT DOCUMENTS

| | | | | |
|---|---|---|---|---|
| 5,870,752 A | * | 2/1999 | Gibbons et al. | 707/102 |
| 6,052,689 A | * | 4/2000 | Muthukrishman et al. | 707/101 |
| 6,108,647 A | * | 8/2000 | Poosala et al. | 707/1 |

OTHER PUBLICATIONS

Chaudhuri, Surajit, et al., "Random Sampling for Histogram Construction: How Much is Enough?" *Proceedings of ACM SIGMOD*, Seattle, Washington, pp. 436–447 (Jun. 1–4, 1998).
Chen, Chungmin M., et al., "Adaptive Selectivity Estimation Using Query Feedback," *Proceedings of the ACM SIGMOD Conference*, Minneapolis, Minnesota, pp. 161–172 (1994).
Gibbons, Phillip B., et al., "Fast Incremental Maintenance of Approximate Histograms," *Proceedings of the 23rd International Conference on Very Large Data Bases (VLDB)*, Athens, Greece, pp. 466–475 (Aug. 26–29, 1997).

Kabra, Navin, et al., "Efficient Mid–Query Re–Optimization of Sub–Optimal Query Execution Plans," *Proceedings of the ACM SIGMOD Conference*, Seattle, Washington, pp. 106–117 (1998).
Kooi, Robert P., *The Optimization of Queries in Relational Databases*, Ph.D. Thesis, Case Western Reserve University, pp. i–vii & 1–159 (Sep. 1980).
Lipton, Richard J., et al., "Practical Selectivity Estimation through Adaptive Sampling," *Proceedings of the ACM SIGMOD International Conference on Management of Data*, Atlantic City, New Jersey, pp. 1–11 (May 23–25, 1990).
Manku, Gurmeet S., et al., "Approximate Medians and other Quantiles in One Pass and with Limited Memory," *Proceedings of the 1998 ACM SIGMOD International Conference on Management of Data*, Seattle, Washington, pp. 426–435 (Jun. 1–4, 1998).

(List continued on next page.)

*Primary Examiner*—Kim Vu
*Assistant Examiner*—Anh Ly
(74) *Attorney, Agent, or Firm*—Watts, Hoffmann, Fisher & Heinke, Co., L.P.A.

(57) ABSTRACT

Building histograms by using feedback information about the execution of query workload rather than by examining the data helps reduce the cost of building and maintaining histograms. A method of maintaining self-tuning histograms updates histograms based on feedback about the execution of a user query. A histogram may be initialized using an assumption of uniform distribution of data or by combining existing histograms. A histogram tuner accesses and estimated result in response to a user query generated by using the histogram. The histogram tuner calculates an estimation error based on the result of the user query and the estimated result. The frequencies of histogram buckets are refined based on the estimation error. The bucket bounds of the histogram are restructured based on the refined frequencies. The method may be performed on-line after a user query or off-line by accessing a workload log. By updating a histogram without accessing the database, the cost of building and maintaining histograms is significantly reduced.

41 Claims, 8 Drawing Sheets

OTHER PUBLICATIONS

Matias, Yossi, et al., "Wavelet–Based Histograms for Selectivity Estimation," *Proceedings of the 1998 ACM SIGMOD International Conference on Management of Data*, Seattle, Washington, pp. 448–459 (Jun. 1–4, 1998).

Muralikrishna, M., et al., "Equi–Depth Histograms For Estimating Selectivity Factors For Multi–Dimensional Queries," *Proceedings of the ACM SIGMOD International Conference on Management of Data*, Chicago, Illinois, pp. 28–36 (Jun. 1–3, 1988).

Nievergelt, J., et al., "The Grid File: An Adaptable Symmetric Multikey File Structure," *ACM Transactions on Database Systems*, vol. 9, No. 1, pp. 38–71 (Mar. 1984).

Poosala, Viswanath, et al., "Improved Histograms for Selectivity Estimation of Range Predicates," *Proceedings of the ACM SIGMOD International Conference on Management of Data*, Montréal, Québec, Canada, pp. 294–305 (Jun. 4–6, 1996).

Poosala, Viswanath, et al., "Selectivity Estimation Without the Attribute Value Independence Assumption," *Proceedings of the 23rd International Conference on Very Large Data Bases (VLDB)*, Athens, Greece, pp. 486–495 (Aug. 26–29, 1997).

Poosala, Viswanath, *Histogram–Based Estimation Techniques in Database Systems*, Ph.D. Thesis, University of Wisconsin–Madison, pp. i–xi & 1–143 (1997).

* cited by examiner

SELF-TUNING HISTOGRAM AND DATABASE MODELING

TECHNICAL FIELD

The present invention relates generally to the field of database systems. More particularly, the present invention relates to the field of histogram construction for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and modify data in a database. Queries are defined by a query language supported by the database system. To enhance performance in processing queries, database servers use information about the data distribution to help access data in a database more efficiently. Typical servers comprise a query optimizer which estimate the selectivity of queries and generate efficient execution plans for queries. Query optimizers generate execution plans based on the query and in doing so exploits statistical information on the column(s) of the table(s) referenced in the queries.

Database servers may create histograms on the columns of tables to represent the distribution of a data. A histogram is one means of representing the distribution of data in a database. A histogram on a data attribute consists generally of a set of partitions or boundaries which divide the range of data on the attribute into a set of segments or buckets. Therefore, each bucket has an upper bucket boundary and a lower bucket boundary. Also associated with each bucket is a frequency which corresponds to the number of data tuples which fall within the boundaries of the bucket. The frequency associated with a bucket, or bucket frequency, is an indication of the density of data within the bucket's boundaries, and should not be confused with the absolute value of the data within the bucket. To construct a histogram, traditional methods must scan at least a portion of the data. The data is scanned and sorted into ascending or descending order. This ordered list of data is then chopped into a desired number of buckets each having a set of boundaries which describe it. The number of values in each bucket is stored along with the bucket boundaries, while the data itself may then be discarded. In order to update a histogram as data changes, traditional methods rescan at least a portion of the data.

The accuracy of the estimations of the query optimizer are enhanced by the availability of histograms, however, creating and maintaining histograms can incur significant costs, particularly for large databases. This problem is particularly striking for multi-dimensional histograms that capture joint distributions of correlated data attributes. Although multi-dimensional histograms can be highly valuable, the relatively high cost of building and maintaining them often prevents their use. An alternative to multi-dimensional histograms is to assume that the attributes are independent, which enables using combinations of one-dimensional histograms. This approach is efficient but very inaccurate. The inaccuracy results in poor choice of execution plans by the query optimizer.

SUMMARY OF THE INVENTION

Building histograms by using feedback information about the execution of query workload rather than by examining the data helps reduce the cost of building and maintaining histograms.

A histogram may be defined such that the histogram comprises a predetermined number of buckets for storing data values. A bucket may comprise an upper bucket bound, a lower bucket bound, and a bucket frequency associated with the number of data tuples that fall within the bounds of the bucket.

In accordance with the present invention, a method is used to maintain a histogram in a database system comprising a database. The method may be implemented in the form of program modules or computer-executable instructions stored on a computer readable medium or in the form of an apparatus having means to perform the steps of the method.

For the method, a user query is examined and an estimated result is generated by a query optimizer in generating a query execution plan using an identified histogram. The actual result returned by the user query is compared to the estimated result and an estimation error is calculated. The estimation error is used to modify the identified histogram. The result used to calculate the estimation error may be the result size returned by the query.

The method may modify an existing histogram as data is updated or initialize a histogram if none exists on a given attribute. An initial histogram for a data attribute or a correlation of multiple data attributes may be constructed by assuming a uniform distribution of data attributes in the database. For multi-column histograms, multiple single dimension histograms may be combined to construct an initial multi-dimensional histogram.

The bucket frequencies of the histogram buckets used to generate the estimated result size may be refined by distributing the error amongst the buckets. The error may be distributed amongst the buckets in proportion to the relative frequencies of the buckets. The frequency of a bucket may be adjusted by the amount of error allocated to the bucket. A damping factor may be applied to smooth the effect of such modifications to the histogram arising out of differences between the estimated and observed numbers of tuples at the onset of a user query.

The upper and lower bounds of the histogram buckets may be restructured as the frequencies are refined. Adjacent buckets having similar frequencies may be selected for merging into a single bucket. After merging buckets, freed buckets may used to split into other buckets. Buckets having the highest frequencies may be selected for splitting. The freed buckets may be assigned to the high frequency buckets in proportion to their relative frequencies.

The updating of the histogram may be performed on-line after each user query or off-line by accessing a workload log that records the series of queries executed against the system. The histogram may be selectively updated when the estimation error of query exceeds a threshold error.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

Building histograms by using feedback information about the execution of query workload rather than by examining the data helps reduce the cost of building and maintaining histograms.

Exemplary Operating Environment

Figure 1:
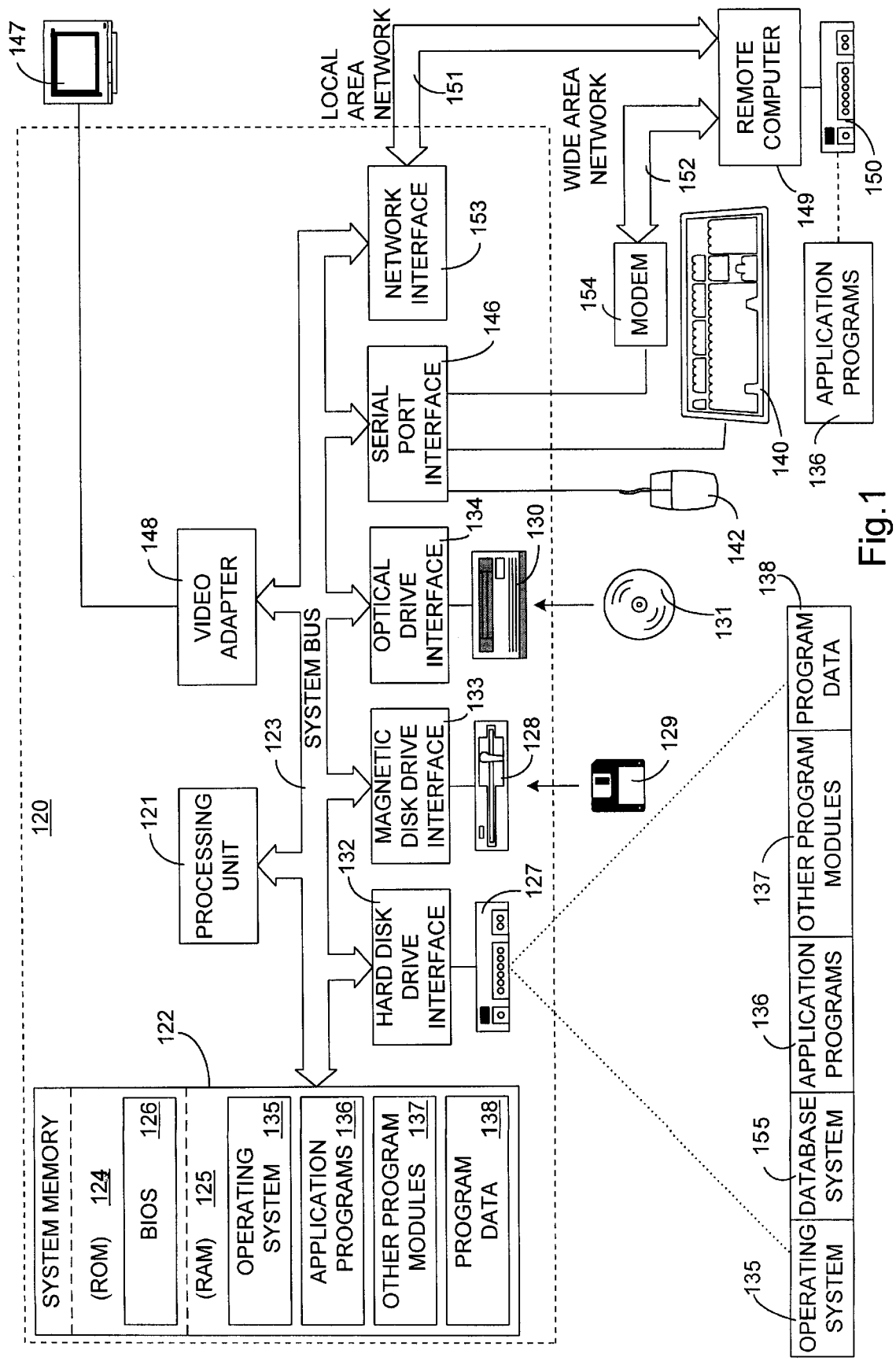
FIG. 1 illustrates an exemplary operating environment for constructing histograms using feedback information about the execution of query workload rather than by examining the data in the database.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 124 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129 and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A database system 155 may also be stored on the hard disk, magnetic disk 129, optical disk 131, ROM 124 or RAM 125. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include local area network (LAN) 151 and a wide area network (WAN) 152. Such networking environments are commonplace in offices, enterprise-wide computer networks, intranets, and the Internet.

When using a LAN networking environment, personal computer 120 is connected to local network 151 through a network interface or adaptor 153. When used in a WAN networking environment, personal computer 120 typically includes a modem 154 or other means for establishing communication over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Database System

Figure 2:
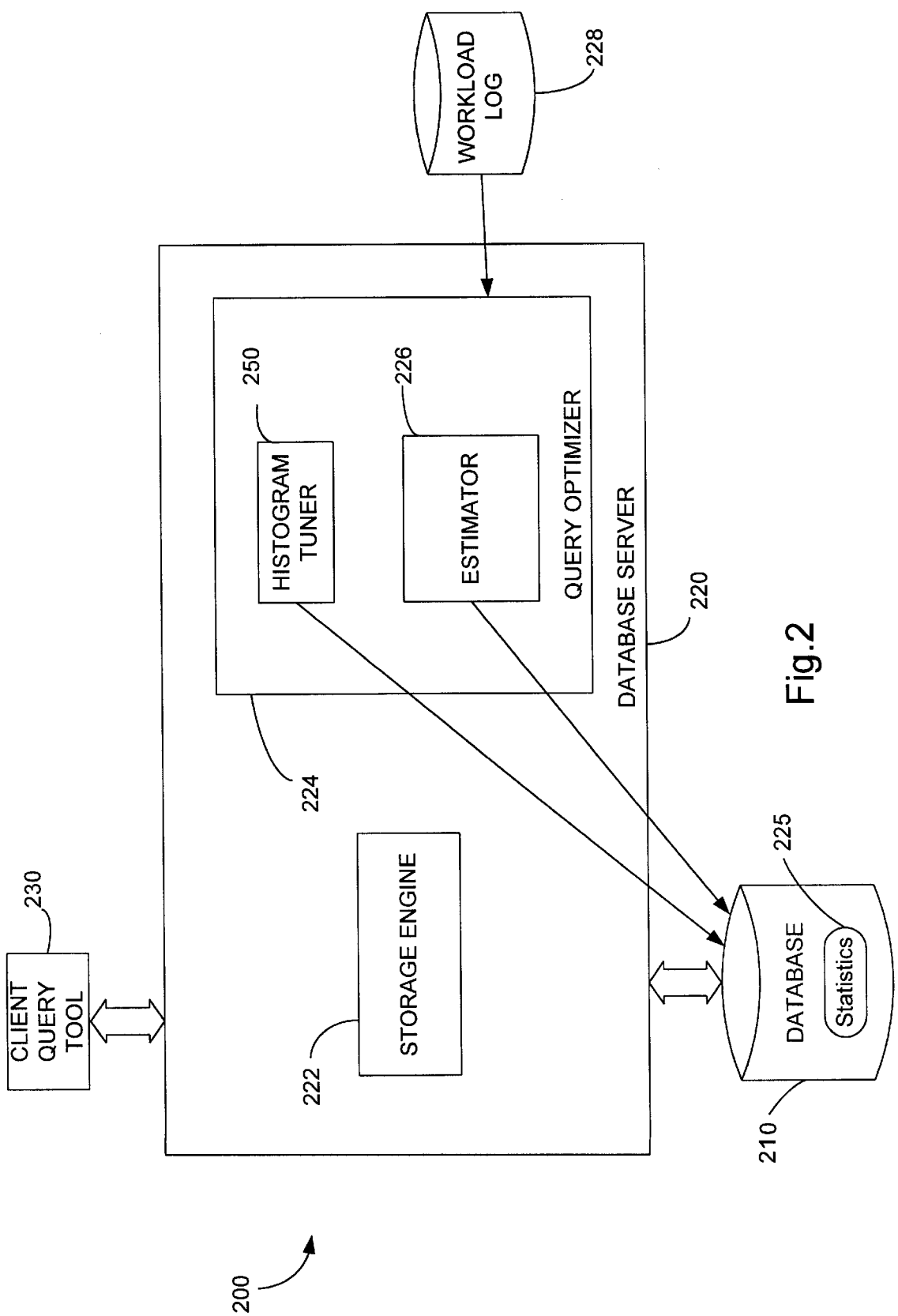
FIG. 2 illustrates, for one embodiment, a database system comprising a histogram tuner for maintaining self-tuning histograms.

FIG. 2 illustrates for one embodiment a computer database system 200 comprising a database 210, a database server 220, and a client tool 230. Database system 200 may be resident on the personal computer 120 such as database system 155 or may be remotely located from the personal computer. The database system 200 manages the storage and retrieval of data in database 210 in accordance with data manipulation statements or queries presented to database system 200 by a database application or by a user, for example.

Database 210 comprises a set of tables of data. Each table comprises a set of records of data stored in one or more data fields. The records of a table are also referred to as rows or tuples, and the data fields of records in a table are also referred to as columns.

Database server 200 processes queries, for example, to retrieve, insert, delete, and/or modify data in database 210. A typical user query includes a selection of data from the database, for example a simple query may inquire about how many records fall between the values represented by certain endpoints, designated rangehigh and rangelow. Other, more complicated queries may involve joins a numerous attributes, but even more complicated queries may have simple selection queries imbedded within them. Database system 200 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in database 210. The enhance performance in processing queries, database server 220 comprises a query optimizer 224 to generate efficient execution plans for queries. Query optimizer 224 comprises an estimator 226 which accesses statistics 225 about the database to estimate the selectivities of a user query. The statistics 225 may be stored in the data stored in the database 210 and loaded into the database when the system is started. The estimator 226 may estimate the selectivities of the operations involved in a user query to determine the order in which these operations should be executed. Query optimizer 224 may maintain or access a workload log 228 which records the series of user queries executed against the system.

The statistics 225 include histograms to capture the distribution of data and aid the query optimizer in estimating the selectivities of a user query. As already discussed, histograms are mathematical representations of a data distribution. Building a histogram involves an I/O cost for scanning or sampling data and a CPU cost for tasks such as sorting the data, partitioning it into buckets, or finding quantiles.

Self-tuning Histograms (ST-histograms)

The statistics 225 used by the estimator 226 to estimate selectivities of queries comprise self-tuning histograms on the column(s) of the tables(s) in the database. The histograms are called self-tuning because they are modified in response to errors in the estimated result(without examining the data in a database). The histogram tuner 250 modifies these self-tuning histograms based on the executions of completed user queries. Traditional methods of creating and maintaining histograms scan the database and build a new histogram using sorting or hashing. The use of ST-histograms avoids the cost of scanning the database.

The histogram tuner 250 may refine the self-tuning histogram on-line or off-line. In the on-line mode, the tuner 250 uses feedback information about the execution of the query immediately available after its execution to refine the self-tuning histogram. In the off-line mode, the tuner accesses information stored in the workload log 228 to modify the self-tuning histograms (abbreviated hereinafter ST-histograms) in one batch at a later time. On-line refinement ensures that the histogram reflects the most up-to-date feedback information but it imposes more overhead during query execution than off-line refinement and can also cause the ST-histogram to become a high-contention hot spot. The overhead imposed by ST-histogram refinement, whether on-line or off-line, can easily be tailored. In particular, the ST-histogram need not be refined in the on-line mode in response to every single selection that uses it. The ST-histogram may only be refined when a relatively high estimation error is encountered. ST-histogram refinement may be discontinued during period of high load or when there is contention for accessing the histogram.

Although ST-histograms of the present invention are of particular utility in maintaining multi-dimensional histograms, ST-histograms are more easily introduced using ST-histograms for single attributes. The principles of ST-histograms for single attributes are analogously applicable to multi-dimensional ST-histograms as will be discussed later.

Figures 3, 4:
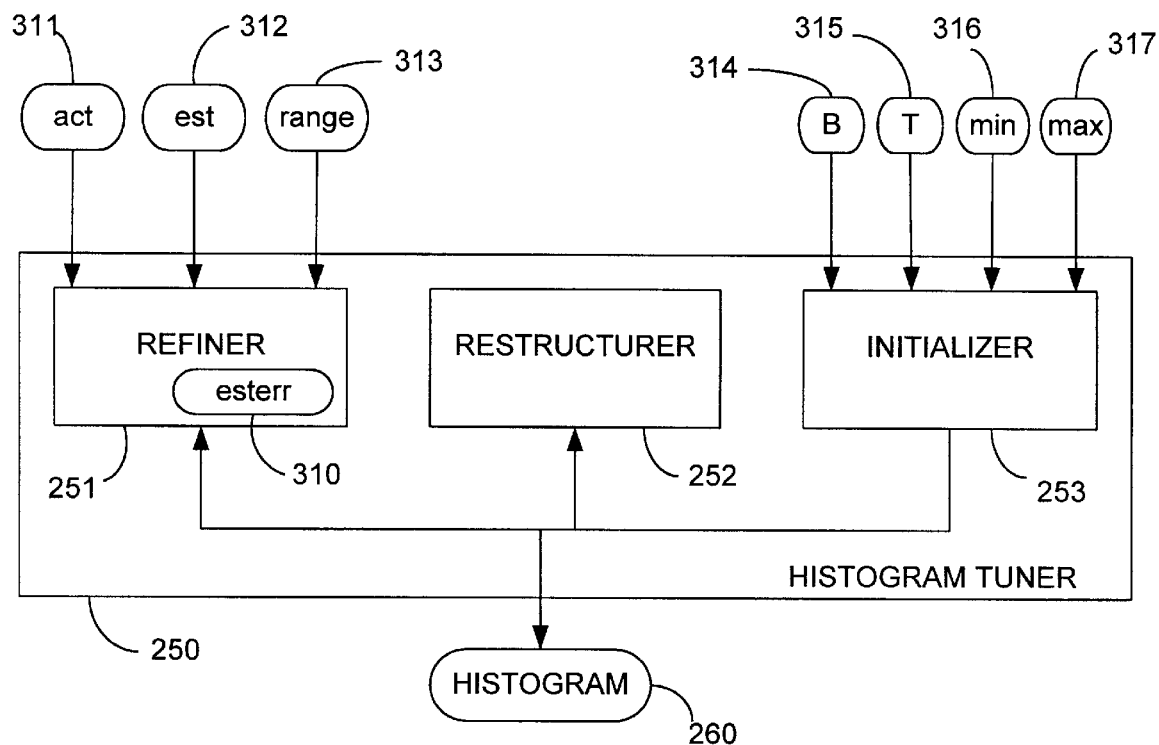
FIG. 3 illustrates a histogram having k buckets $b_1, b_2, \ldots, b_k$ each defined by a set of bucket bounds [low(b), high(b)] and a bucket frequency freq(b)
FIG. 4 illustrates, for one embodiment, a histogram tuner for maintaining self-tuning histograms.

FIG. 3 illustrates a single attribute ST-histogram. Such a ST-histogram consists of a set of buckets. Each bucket, b, stores the range that it represents as bucket bounds, [low(b), high(b)], and the number of tuples in this range as the bucket frequency, freq(b). Adjacent buckets share the bucket endpoint bounds, and the ranges of all the buckets together cover the entire range of values of the histogram attribute.

The lifecycle of a ST-histogram (260 in FIG. 4) consists of two stages. First, it is initialized and then, it is updated. The histogram 260 on a selected attribute is identified by the tuner or may be initialized by the histogram tuner initializer 253 or by another device by accessing known statistical information about the data distribution of the selected attribute(see step 410 in FIG. 5). The process of updating is performed by the histogram tuner 250 which comprises a refiner 251 and a restructurer 252 as illustrated in FIG. 4. The refiner 251 refines individual bucket frequencies, and restructurer 252 moves the bucket bounds. The bucket frequencies may be refined with every range selection query on the histogram attribute, while the bucket bounds are generally restructured less frequently. Although the refining of bucket frequencies and the restructuring of the bucket bounds are disclosed in conjunction herein, the refining or restructuring process may be practiced separately, without the other.

The histogram tuner initializer 253 may initialize a ST-histogram by assuming that the data distribution in the database is uniform. To initialize a histogram on an attribute a in this manner, the histogram initializer 253 uses the desired number of buckets, B 314, the number of tuples in the relation, T 315, and the minimum and maximum values of a, min 316 and max 317. The B buckets of the initial histogram are evenly spaced between min and max. At the time of initializing the histogram structure, the tuner assigns each of the buckets a bucket frequency of T/B (with some provision for rounding).

The value for T may be found in statistics routinely kept for the database 210 (FIG. 2). The values of min and max may be approximated using domain constraints on a column or minimum and maximum values referenced in the query workload log 228.

Figure 5A:
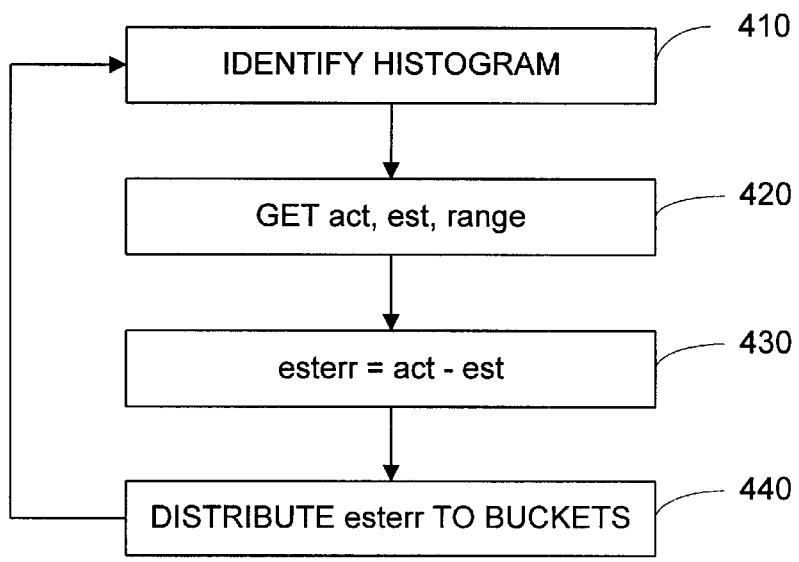
FIG. 5A illustrates, for one embodiment, a flow diagram for maintaining a self-tuning histogram using the present method.

Referring to FIGS. 4 and 5A, the bucket frequencies of a ST-histogram 260 are refined with feedback information from the queries of the workload. For step 420 of FIG. 5A, the histogram tuner 250 gathers the actual result size 311, the estimated result size 312, and the range of the user query 313. In step 430 of FIG. 5, for every selection on the histogram attribute, the absolute estimation error 310 is computed by the refiner 251, as the difference between the estimated and actual result sizes 312,311, respectively. In step 440 of FIG. 5A, the refiner 251 refines the frequencies of the buckets that were used to generate the estimated result size based on the error 310.

To refine the bucket frequencies, the refiner uses the range selection 313, rangehigh and rangelow, the actual result size 311 available from the execution of the query, and the estimated result size available from the query optimizer 224. The refiner 251 computes the absolute estimation error 310, esterr, as the difference between the actual result size 311 and the estimated result size 312. The refiner 251 distinguishes between overestimation, indicated by a negative error and requiring the bucket frequencies to be lowered, and underestimation, indicated by a positive error and requiring the bucket frequencies to be raised.

The refiner 251 then determines the histogram buckets that overlap the selection range and whether they partially overlap the range or are totally contained in it. Each bucket frequency is approximated by the average of the frequencies of occurrences of values in the bucket. The contribution of a histogram bucket to the result size is equal to its frequency times the fraction of the bucket overlapping the selection range. The portion of the error for which the bucket is responsible, denoted here as frac, is the length of the interval where the bucket overlaps the selection range divided by the length of the interval represented by the whole bucket:

$$frac = \frac{\min(rangehigh, high(h_i)) - \max(rangelow, low(b_i)) + 1}{high(b_i) - low(b_i) + 1}$$

The fraction frac is less than or equal to 1 only for the first and last buckets, $b_1$ and $b_k$. For all other buckets, this quantity is equal to 1 and the whole bucket frequency appears in the result size.

In step 440 of FIG. 5, to refine the bucket frequencies, the refiner 251 distributes the error among buckets in proportion to bucket frequency. As is illustrated in the following formula, a new frequency is assigned to a bucket by adding an adjustment quantity to the original bucket frequency freq(b). The adjustment quantity is composed of the product of a damping factor D and the portion of the error that the bucket is responsible given by esterr multiplied by frac. The adjustment quantity is weighted by including the value of freq($b_i$) to increase the adjustment quantity for those buckets having higher frequencies. Finally, the adjustment portion is normalized by dividing by the estimated result, est.

$$freq(b_i) = \max(freq(b_i) + (D * esterr * frac * freq(b_i)/est), 0)$$

A damping factor value of 0.5 to 1 is recommended. The formula for refining bucket frequencies also makes sure that they never drop below 0.

Figure 5B:
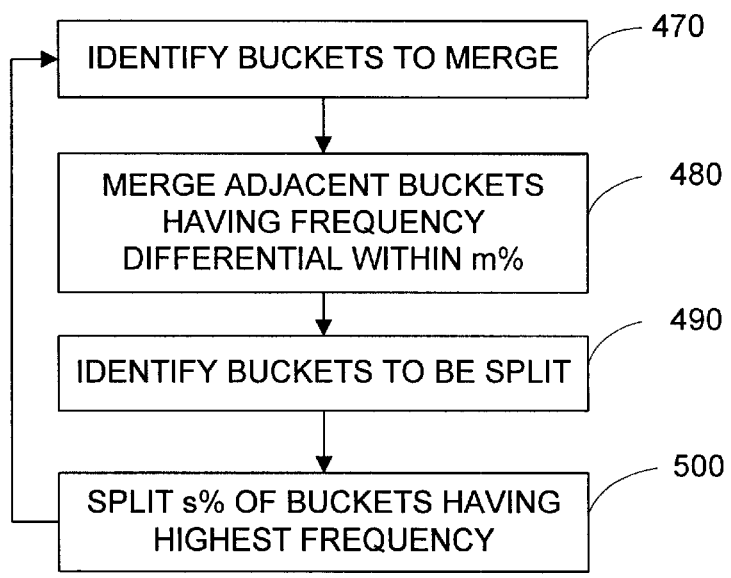
FIG. 5B illustrates, for one embodiment, a flow diagram for maintaining a self-tuning histogram using the present method.

As can be seen in FIGS. 5A and 5B, the refinement process as shown in FIG. 5A and the restructuring process shown in FIG. 5B are independent. The histogram tuner 250 calls either process as necessary. For example, the histogram tuner 250 may implement a restructuring interval R (not shown), in which a counter r is incremented each time the bucket frequencies are refined until r reaches the target value of R. When the target value for R is reached, the histogram tuner 250 may invoke the restructurer 252 to move the bucket bounds to get a better partitioning that avoids grouping high frequency and low frequency values in the same buckets. A restructuring interval, R, of 200 may be advantageous.

Ideally, the restructurer 252 restructures the histogram such that high frequency buckets are as narrow as possible. A technique which results in high frequency buckets having narrow bounds reduces possible variance among the frequency of values in a bucket, resulting in a more accurate histogram. To implement the restructuring, the restructurer 252 splits buckets that currently have a high frequency into several buckets. Splitting helps separate the high frequency and low frequency values into different buckets for. The refiner 251 then refines the bucket frequencies of the new buckets.

If it is undesirable to increase the total number of buckets in the histogram, the restructurer 252 may also merge sets of adjacent buckets having similar frequency. The merging process frees buckets which may then be reassigned to splitting buckets.

In step 470 of FIG. 5B, the restructurer 252 uses a merge threshold, m, to determine which buckets to merge. A merge threshold, m, of 1% proves to be beneficial. In step 480 of FIG. 5B, the restructurer 252 scans the histogram buckets and finds the pair of adjacent runs of buckets such that the maximum difference in frequency between a bucket in the first run and a bucket in the second run is the minimum over all pairs of adjacent runs. The two runs are merged into one if this difference is less than the merge threshold which is m % of the total number of tuples T of each other. The merge process is repeated until the minimum difference between adjacent runs is greater than the merge threshold. This process results in a number of runs of several buckets that are each merged into one bucket spanning the whole run and with a frequency equal to the total frequency of all the buckets in the run. This frees a number of histogram buckets to allocate to high frequency buckets during splitting.

With buckets freed up from merging, the restructurer 252 then splits buckets. In step 490 of FIG. 5B, the restructurer 252 uses a split percent s to determine which buckets are to be split. A split percent, s, of 10% may be advantageous. The restructurer identifies the s percent of the buckets that have the highest frequencies and are not singleton buckets or buckets chosen for merging. In step 500 of FIG. 5B, the buckets freed by merging are distributed among the buckets being split in proportion to their frequencies. Thus, a bucket being split, $b_i$, gets freq($b_i$)/totalfreq of the extra buckets, where totalfreq is the total frequency of the buckets being split. The restructurer 252 splits a bucket by replacing the bucket with the bucket itself plus the extra buckets assigned to it. These new buckets have bucket bounds that are evenly spaced in the range of the old bucket, and the frequency of the old bucket is evenly distributed among them.

EXAMPLE 1

Figure 6:
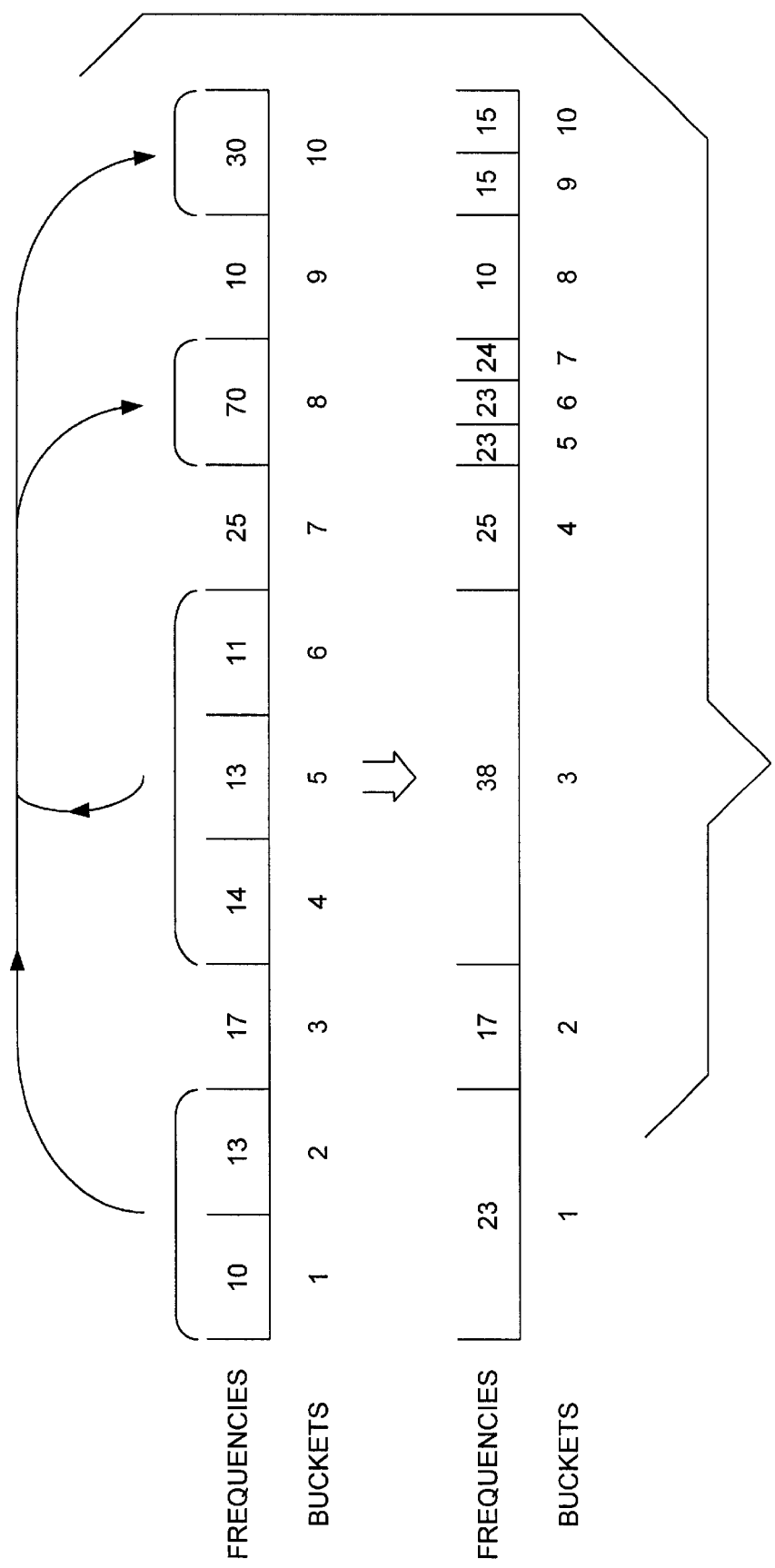
FIG. 6 illustrates, for one embodiment, an example of the restructuring of a self-tuning histogram using the present method.

FIG. 6 illustrates an example of the histogram restructuring. In this example, the merge threshold is a difference in bucket frequencies of 3 or less tuples. The merging scan identifies two runs of buckets to be merged, buckets 1 and 2, and buckets 4 to 6. Merging these sets of buckets frees three buckets to assign to high frequency buckets. The split percent is such that the two buckets with the highest frequencies are to be split, buckets 8 and 10. Assigning the extra buckets to these two buckets in proportion to frequency means that bucket 8 gets two extra buckets and bucket 10 gets an extra bucket. The new buckets are evenly spaced in the range spanned by the buckets being split, and the frequency of the bucket being split is evenly distributed among the new buckets. In splitting bucket 8, one of the new buckets gets an extra tuple due to rounding.

Splitting may unnecessarily separate values with similar, low frequencies into different buckets. Such runs of buckets with similar low frequencies would be merged during subsequent restructuring. Notice that splitting distorts the frequency of a bucket by distributing it among the new buckets. This means that the histogram may lose some of its accuracy by restructuring. This accuracy is restored when the bucket frequencies are refined.

Multi-Dimensional Histograms

With multi-dimensional ST-histograms, the goal is to build histograms representing the joint distribution of multiple attributes of a single relation. These ST-histograms are used to estimate the result size of conjunctive range selections on these attributes, and are refined based on feedback from these selections. Using accurate on-dimensional histograms for all the attributes is not enough, because they do not reflect the dependencies between attributes.

Working in multiple dimensions raises the issue of how to partition the multi-dimensional space into histogram buckets. The effectiveness of ST-histograms stems from their ability to pinpoint the buckets contributing to the estimation error and "learn" the data distribution. For this method, a grid partitioning may be used due to its simplicity and low cost. The simplicity of a grid partitioning allows the ST-histograms to have more buckets for a given amount of memory.

Figure 7:
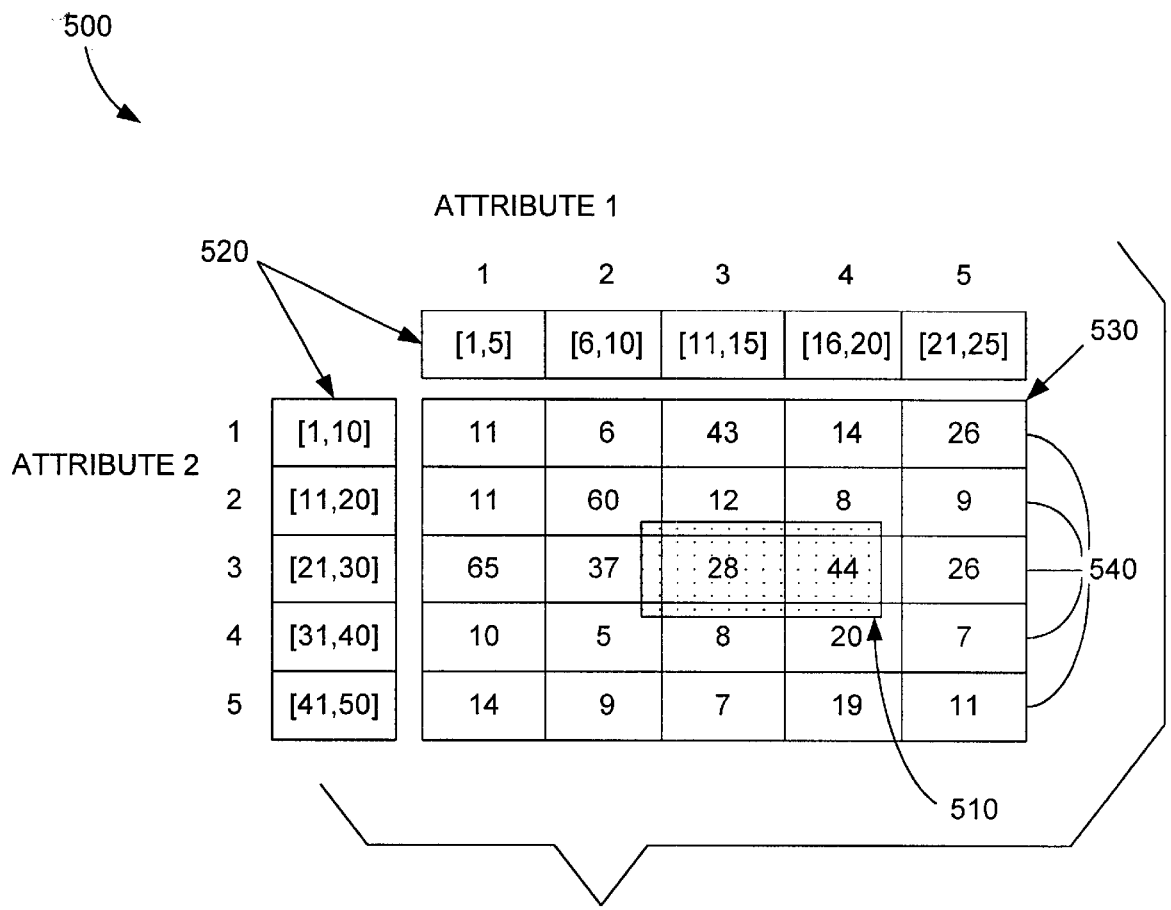
FIG. 7 illustrates, for one embodiment, a multi-dimensional self-tuning histogram.

FIG. 7 illustrates a 5×5 ST-histogram 500 and a range selection 510 using it. A grid type partitioning is used. Each dimension, i, of an n-dimensional ST-histogram is partitioned into $B_i$ partitions. $B_i$ does not necessarily equal $B_j$ for i≈j. The partitioning of the space is described by n arrays, one per dimension, which are called scales 520. In addition to the scales, a multi-dimensional ST-histogram has an n-dimensional matrix representing the grid cell frequencies, which is called the frequency matrix 530.

Figure 8A:
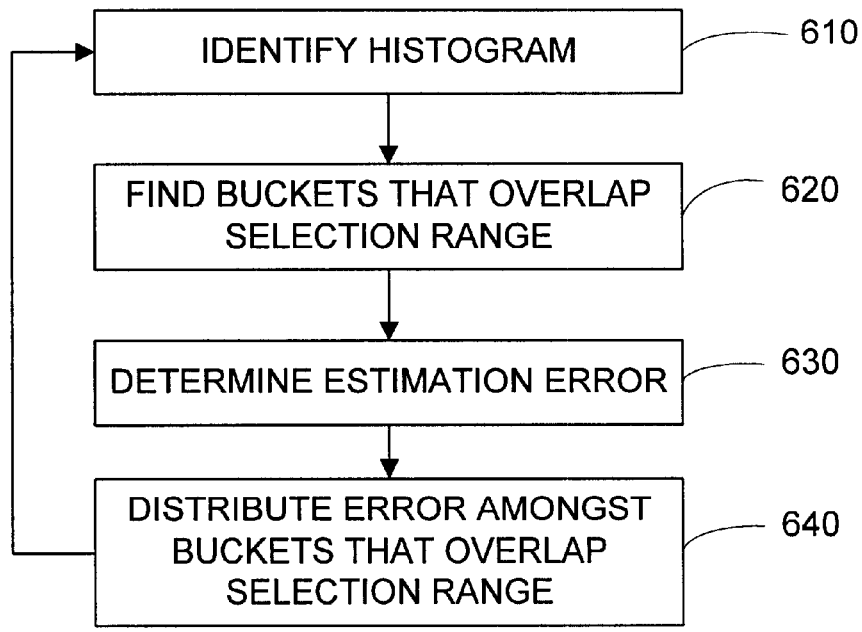
FIG. 8A illustrates, for one embodiment, a flow diagram for maintaining a multi-dimensional self-tuning histogram using the present method.
Figure 8B:
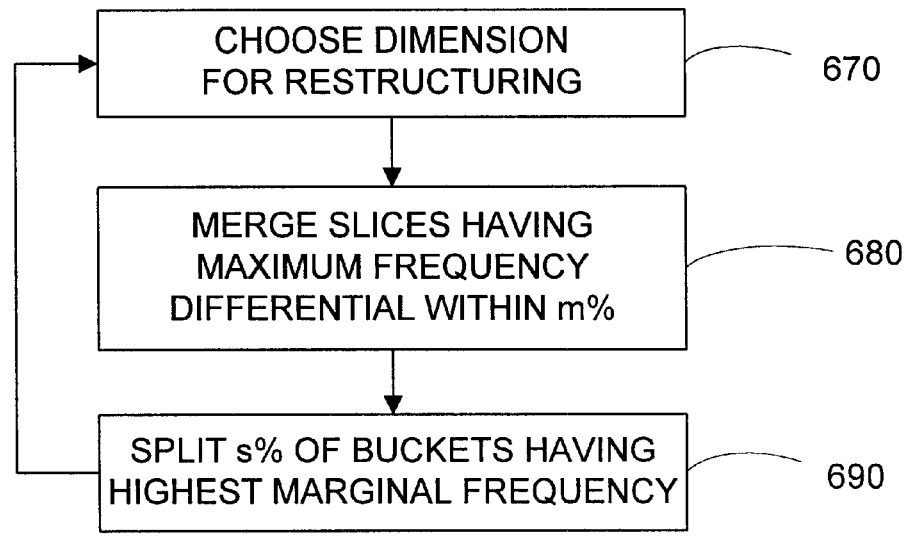
FIG. 8B illustrates, for one embodiment, a flow diagram for maintaining a multi-dimensional self-tuning histogram using the present method.

FIGS. 8A and 8B illustrate a general flow diagram for refining and restructuring a multi-dimensional ST-histogram. In step 610, the histogram tuner 250 identifies the histogram for the set of attributes involved in a user query or initializes a histogram if none is available. To initialize a multi-dimensional ST-histogram 500, the histogram tuner 250 obtains the desired number of partitions in each dimension, the number of tuples in the relation (T), and the minimum and maximum values in each attribute of the relation (see FIG. 4). As with single dimension ST-histograms, one way of initializing the histogram is to assume uniformity and independence of the variables. The histogram tuner 250 partitions each dimension, i, into $B_i$ equally spaced partitions, and evenly distributes the T tuples of the relation among all the buckets of the frequency matrix.

Another way of initializing multi-dimensional ST-histograms is to start with traditional one-dimensional histograms on all the multi-dimensional histogram attributes. If such one-dimensional histograms are available, they provide a better starting point than assuming uniformity and independence. The histogram tuner 250 initializes the scales by partitioning the space along the bucket bounds of the one-dimensional histograms and initializes the frequency matrix by assuming that the attributes are independent. Under the independence assumption, the initial frequency of a cell, freq[$j_1,j_2,K,j_n$], is given by:

$$1/T^{n-1} \prod_{i=1}^{n} freq_i[j_i]$$

where freq[$j_i$] is the frequency of bucket $j_i$ of the histogram for dimension i. It should be noted that the method of the present invention may be practiced on an existing histogram, such that initializing the histogram is not necessary.

The algorithm for refining bucket frequencies in the multi-dimensional case is identical to the one-dimensional algorithm except that in step 620 the histogram refiner 251 must scan a multi-dimensional structure to find the histogram buckets that overlap the selection range 510 and the fraction of the bucket overlapping the selection range is equal to the volume of the region where the bucket overlaps the selection range divided by the volume of the region represented by the whole bucket. The tuner 250 then determines the estimation error 630 and distributes the error amongst the buckets that overlap the selection range 510 in step 640. A restructuring interval R is used to determine the relative frequency of restructuring to refining.

Periodic restructuring is needed only for multi-dimensional histograms initialized assuming uniformity and independence. As in the one dimensional case, restructuring in the multi-dimensional case is based on merging buckets with similar frequencies and splitting high frequency buckets. The restructuring of a multi-dimensional ST-histogram is analogous to the restructuring of a single dimension ST-histogram. The histogram restructurer 252 changes the partitioning of the multi-dimensional space one dimension at a time. A dimension is selected to be restructured (various techniques are be used to determine which dimension or dimensions should be restructured) and the partition boundaries of each dimension are modified independent of other dimensions, in fact, not all dimensions need to be restructured at any given time. In an embodiment of the invention, the restructurer 252 cycles through the dimensions in a predetermined order. In step 670, the restructurer chooses the dimension to be restructured. The restructurer 252 uses the merge threshold m and the split percent s as with a single dimension histogram.

For an n-dimensional ST-histogram, every partition of the scales in any dimension identifies an (n−1)-dimensional "slice" 540 of the frequency matrix (e.g., a row or a column in a two-dimensional histogram). Thus, merging two partitions of the scales 520 in any dimension requires merging not just a pair of buckets, but a pair of slices 540 of the frequency matrix, each containing several buckets. Every bucket from the first slice has to be merged with the corresponding bucket from the second slice. To decide whether or riot to merge two slices, in step 680, the restructurer 252 finds the maximum difference in frequency between any two corresponding buckets that would be merged if these two slices are merged. The restructurer merges two slices only if this difference is within m*T (m being the merge threshold and T being the number of tuples) tuples. While merging in any dimension, the restructrurer 252 uses this method to identify runs of partitions to merge and repeats the process as in the one dimensional case already discussed.

In step 690, the restructurer 252 splits the high frequency partitions of any dimension by assigning them the extra partitions freed by merging in the same dimension. Thus the restructurer does not change the number of partitions in a dimension. The restructurer 252 uses the marginal frequency distribution along the dimensions to decide which partitions to split an any dimension and how may extra partitions each one gets. The marginal frequency of a partition is the total frequency of all the buckets in the slice of the frequency matrix that it identifies. Thus, the marginal frequency of a partitions $j_i$ in dimension i is given by:

$$f_i(j_i) = \sum_{j_1=1}^{B_1} \sum_{j_{i-1}=1}^{B_{i-1}} \sum_{j_{i+1}=1}^{B_{i+1}} \sum_{j_n=1}^{B_n} freq[j_1, j_2, K, j_n]$$

As in the one-dimensional case, the restructurer 252 splits the s percent of the partitions in any dimension with the highest marginal frequencies, and assigns them the extra partitions in proportion to their current marginal frequencies.

EXAMPLE 2

Figure 9:
FIG. 9 illustrates, for one embodiment, an example of the restructuring of a multi-dimensional self-tuning histogram.

FIG. 9 demonstrates restructuring the histogram in FIG. 7 along the vertical dimension (attribute 2). Assume, for the sake of the example, that the merge threshold is such that we merge two partitions if the maximum difference in frequency between corresponding buckets in their slices that would be merged is within 5. Using this condition, the restructurer identifies one pair of partitions to merge, partitions 4 and 5. Assume also that the split percent is such that we split one partition along the vertical dimension. The restructurer computes the marginal frequency distribution along the vertical dimension and identify the partition with the maximum marginal frequency, partition 3. Merging and splitting results in the restructured histogram shown in FIG. 9. The restructurer provides some provisions for rounding during splitting because bucket frequencies are integers.

Multi-dimensional ST-histograms are very useful. In accurate estimations of selectivities, traditional multi-dimensional histograms are much more expensive than traditional one-dimensional histograms, increasing the value of the savings in cost offered by ST-histograms. Furthermore, ST-histograms are very competitive in terms of accuracy with traditional multi-dimensional histograms for data distributions with low to moderate skew. As explained above, multi-dimensional ST-histograms can be initialized using traditional one-dimensional histograms and subsequently refined to provide a cheap and efficient way of capturing the joint distribution of multiple attributes. The other inexpensive alternative of assuming independence has been repeatedly demonstrated to be inaccurate. Furthermore, note that building traditional histograms is an off-line process, meaning that histograms cannot be used until the system incurs the whole cost of completely building them. This is not true of ST-histograms. Finally, note that ST-histograms make it possible to inexpensively build not only two-dimensional, but also n-dimensional histograms.

ST-histograms are also a suitable alternative when there is not enough time for updating database statistics to allow building all the desired histograms in the traditional way. This may happen in data warehouses that are updated periodically with huge amounts of data. The sheer data size may prohibit rebuilding all the desired histograms during the batch window. This very same data size makes ST-histograms an attractive option, because examining the workload to build histograms will be cheaper than examining the data and can be tailored to a given time budget.

The technique of ST-histograms can be an integral part of database servers as database systems move toward becoming self-tuning. In particular, if a self-tuning database system decides that a histogram on some attribute or attribute combination may improve performance, it can start by building a ST-histogram. The low cost of ST-histograms allows the system to experiment more extensively and try out more histograms than if traditional histograms were the only choice. Subsequently, on can construct a traditional histogram only if the ST-histogram does not provide the required accuracy.

Another possible application of ST-histograms is for systems that involve queries on remote data sources. With recent trends in database usage, query optimizers need to optimize queries involving remote data sources not under their direct control. Accessing the data and building traditional histograms for such data sources may not be easy or even possible. Query results on the other hand, are available from the remote source, making ST-histograms an attractive option.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather that a restrictive sense.

We claim:

1. In a database system, a method of maintaining a self-tuning histogram having a plurality of buckets defined by at least two bucket boundaries and a bucket frequency comprising:
    (a) identifying the histogram;
    (b) using the histogram to generate an estimated result size in response to a user query;
    (c) calculating an estimation error based on the estimated result size and the size of the result of the user query;
    (d) dividing the estimation error into one or more portions;
    (e) applying the portions to the bucket frequencies of one or buckets to modify the bucket frequencies.

2. The method of claim 1 wherein the step of applying the estimation error portions comprises applying the portions to the bucket frequencies of the one or more buckets in proportion to their relative bucket frequency.

3. The method of claim 1 wherein the step of applying the estimation error portions comprises applying the portions to the bucket frequencies of buckets used to generate the estimated result size.

4. The method of claim 1 wherein the step of identifying the histogram comprises initializing the histogram.

5. The method of claim 4 wherein the step of initializing the histogram comprises assigning substantially uniform bucket frequencies and bucket boundaries to the buckets.

6. The method of claim 4 wherein the step of initializing the histogram comprises combining a plurality of existing histograms.

7. The method of claim 1 wherein the self-tuning histogram is multi-dimensional.

8. A method of building and maintaining a self-tuning histogram having a plurality of buckets each defined by at least two bucket boundaries and a bucket frequency comprising the steps of:
    a) initializing the histogram;
    b) using the histogram to generate an estimated result size in response to a user query;
    c) calculating an estimation error based on the size of the result of the user query and the estimated result size;

d) modifying the frequency of the buckets by applying a damping factor to the estimation error, dividing the estimation error into one or more portions and applying the portions to the bucket frequencies of the buckets used to generate the estimation error in proportion to their relative bucket frequency; and e) redefining the bucket boundaries of one or more of the buckets by merging adjacent buckets having relatively similar frequencies into single buckets to free buckets, selecting buckets belonging to a set of buckets having the highest frequency to be split, and splitting the selected buckets into a plurality of buckets such that the total number of buckets remains constant.

9. The method of claim 8 wherein the step of merging buckets is performed by repeatedly scanning the histogram buckets and finding adjacent buckets having the minimum difference in frequencies and merging the buckets if the difference in frequencies is below a predetermined threshold.

10. The method of claim 8 wherein the self-tuning histogram is multi-dimensional.

11. The method of claim 8 wherein the step of initializing the histogram comprises assigning uniform frequencies and boundaries to the buckets.

12. The method of claim 8 wherein the step of initializing the histogram comprises combining a plurality of existing histograms.

13. The method of claim 8 wherein the step of modifying the frequency of the buckets is performed immediately following an execution of user query.

14. The method of claim 8 wherein the steps of generating an estimated result size and calculating an estimation error are performed by accessing a log of stored user queries and corresponding result sizes.

15. The method of claim 8 wherein the step of redefining the bucket boundaries comprises merging adjacent buckets when the total number of buckets reaches a predetermined limit on the number of buckets.

16. The method of claim 8 wherein the step of modifying the bucket frequencies is performed when a predetermined minimum estimation error has been observed.

17. A method of building and maintaining an n dimensional self-tuning histogram having a plurality of buckets arranged in a grid, each bucket defined by at least four grid partitions and a bucket frequency, the histogram being defined by n scales, one scale for each dimension, and an n dimensional frequency matrix, each of the scales defining the partitions of the frequency matrix which divide the frequency matrix into a plurality of (n−1) dimensional slices of the frequency matrix comprising the steps of:

a) initializing the histogram;

b) using the histogram to generate an estimated result size in response to a user query;

c) calculating an estimation error based on the size of the result of the user query and the estimated result size;

d) modifying the frequency of the buckets in the frequency matrix by dividing the estimation error into one or more portions and applying the portions to the bucket frequencies of the buckets used to generate the estimation error in proportion to their relative bucket frequency; and e) changing the scales of the histogram in at least one dimension to redefine the grid partitions by merging adjacent slices of the frequency matrix having relatively similar frequencies to free buckets, selecting slices of the frequency matrix belonging to a set of slices having the highest marginal frequency to be split, and splitting the selected slices into a plurality of slices such that the total number of buckets remains constant.

18. The method of claim 17 wherein the step of initializing the histogram comprises assigning uniform frequencies and partitions to the frequency matrix.

19. The method of claim 17 wherein the step of initializing the histogram comprises combined a plurality existing histograms.

20. The method of claim 19 wherein the step of merging adjacent slices is performed by repeatedly scanning the histogram buckets and finding adjacent slices having the minimum difference in frequencies between corresponding buckets and merging the slices if the difference in frequencies is below a predetermined threshold.

21. The method of claim 19 wherein the steps are performed immediately following an execution of user query.

22. The method of claim 19 wherein the steps are performed by accessing a log of stored user queries and corresponding result sizes.

23. A computer-readable medium having computer executable instructions for performing steps for maintaining a self-tuning histogram in database wherein user queries are executed on the database to return query results, the method comprising:

(a) identifying a self-tuning histogram having a plurality of buckets defined by at least two bucket boundaries and a bucket frequency; and (b) updating the histogram based on the results of an executed query against the database by using the histogram to generate an estimated result size in response to a user query, calculating an estimation error based on the size of the result of the user query and the estimated result size, and updating the histogram based on the estimation error.

24. The computer readable medium of claim 23 wherein the step of updating the histogram comprises modifying the bucket frequency of one or more of the buckets based on the estimation error.

25. The computer readable medium of claim 24 wherein the step of modifying the bucket frequency of the one or more buckets comprises:

I) dividing the estimation error into one or more portions; and

II) applying the portions to the bucket frequencies of the buckets used to generate the estimated result.

26. The computer readable medium of claim 24 wherein the step of modifying the bucket frequency of the one or more buckets comprises:

I) dividing the estimation error into one or more portions; and

II) applying the portions to bucket frequencies of the buckets in proportion to their relative bucket frequency.

27. The computer readable medium of claim 23 wherein the step of identifying the histogram comprises initializing the histogram.

28. The computer readable medium of claim 27 wherein the step of initializing the histogram comprises assigning substantially uniform bucket frequencies and bucket boundaries to the buckets.

29. The computer readable medium of claim 23 wherein the self-tuning histogram is multi-dimensional.

30. The computer readable medium of claim 23 additionally including computer readable instructions for redefining one or more bucket boundaries based on bucket frequencies.

31. The computer readable medium of claim 30 wherein the step of redefining the one or more bucket boundaries comprises splitting one or more buckets that meet a split criteria into a plurality of buckets.

32. The computer readable medium of claim 31 wherein the step of redefining the one or more bucket boundaries comprises merging one or more sets of adjacent buckets that meet a merge criteria.

33. The computer readable medium of claim 32 wherein the merge criteria comprises having a bucket frequency relatively similar to the bucket frequency of adjacent buckets.

34. The computer readable medium of claim 32 wherein the step of merging buckets generates free buckets for splitting buckets.

35. The computer readable medium of claim 34 wherein the step of splitting buckets comprises allocating freed buckets to one or more buckets in proportion to their relative bucket frequency.

36. The computer readable medium of claim 31 wherein the split criteria comprises belonging to a set of buckets having the highest bucket frequencies.

37. The computer readable medium of claim 31 wherein the step of redefining one or more bucket boundaries is performed such that the total number of buckets remains constant.

38. An apparatus for maintaining a self-tuning histogram in database wherein user queries are executed on the database to return query results, and wherein the histogram has a plurality of buckets defined by at least two bucket boundaries and a bucket frequency comprising:

a) means for refining the bucket frequencies based on the results of an executed query against the database;

b) means for redefining one or more of the bucket boundaries based on the bucket frequencies comprising means for calculating an estimation error based on the size of a result of a user query and an estimated result size estimated using the histogram; and wherein the means for refining refines the frequencies by distributing the estimation error amongst bucket frequencies.

39. The apparatus of claim 38 wherein the means for redefining the bucket boundaries comprises means for merging one or more sets of adjacent buckets having relatively similar bucket frequencies and means for splitting buckets belong to a set of buckets having a relatively high bucket frequency into a plurality of buckets.

40. An apparatus for maintaining a self-tuning histogram in database wherein user queries are executed on the database to return query results, and wherein the histogram has a plurality of buckets defined by at least two bucket boundaries and a bucket frequency comprising:

a) a memory device for storing a database comprising multiple data records;

b) a computer having one or more processing units for executing a stored computer program, said computer including a rapid access memory store; and c) an interface for coupling the memory device for storing the database to the computer to allow records to be retrieved from the database; wherein d) the computer executing a stored program having software components including i) a component for providing a statistical model of the data distribution in the form of a self-tuning histogram having a plurality of buckets defined by at least two bucket boundaries and a bucket frequency; ii) a component for refining the bucket frequencies based on the results of an executed query against the database comprising a component for determining an estimation error based on the result size of a user query and an estimated result size as determined by the statistical model; and iii) a component for redefining at least one bucket boundary based on the bucket frequencies by applying the estimation error to the bucket frequencies.

41. The apparatus of claim 40 wherein the component for redefining the bucket boundaries further comprises a component for merging one or more sets of adjacent buckets that have similar bucket frequencies and a component for splitting one or more buckets belonging to a set of having relatively high bucket frequency into a plurality of buckets.

* * * * *